United States Patent [19]
Hutchins

[11] Patent Number: 5,944,001
[45] Date of Patent: Aug. 31, 1999

[54] LIQUID FROM GAS SEPARATOR AND AN INTERNAL COMBUSTION ENGINE INCLUDING SAME

[75] Inventor: William Richard Hutchins, Kenilworth, United Kingdom

[73] Assignee: Rover Group Limited, Warwick, United Kingdom

[21] Appl. No.: 09/091,396

[22] PCT Filed: Dec. 2, 1996

[86] PCT No.: PCT/GB96/02967

§ 371 Date: Aug. 13, 1998

§ 102(e) Date: Aug. 13, 1998

[87] PCT Pub. No.: WO97/23711

PCT Pub. Date: Jul. 3, 1997

[30] Foreign Application Priority Data

Dec. 22, 1995 [GB] United Kingdom .................. 9526349

[51] Int. Cl.[6] .......................... F01M 13/04; B01D 45/16
[52] U.S. Cl. ........................................................... 123/572
[58] Field of Search .................................... 123/572, 573, 123/574, 41.86

[56] References Cited

U.S. PATENT DOCUMENTS

| | | | |
|---|---|---|---|
| 4,375,365 | 3/1983 | Müller . | |
| 4,528,969 | 7/1985 | Senga | 123/572 |
| 4,565,164 | 1/1986 | Satoh et al. | 123/572 |
| 4,569,323 | 2/1986 | Okumura | 123/572 |
| 4,723,529 | 2/1988 | Yoyoi et al. . | |
| 4,820,427 | 4/1989 | Ryynänen . | |
| 5,318,609 | 6/1994 | Kittler . | |
| 5,460,147 | 10/1995 | Bohl | 123/572 |
| 5,617,834 | 4/1997 | Lohr | 123/572 |

FOREIGN PATENT DOCUMENTS

| | | |
|---|---|---|
| 527353 | 11/1920 | France . |
| 2 431 874 | 2/1980 | France . |
| 352123 | 4/1920 | Germany . |
| 368667 | 2/1923 | Germany . |
| 24 61 113 | 7/1975 | Germany . |
| 2 001 260 | 1/1979 | United Kingdom . |
| 2 131 484 | 6/1984 | United Kingdom . |

Primary Examiner—Marguerite McMahon
Attorney, Agent, or Firm—Davis and Bujold

[57] ABSTRACT

A separator (8) for separating liquid from gas is disclosed in which two or part cylindrical chambers (12, 12', 14, 14', 16) are arranged to produce contra-rotating vortices therein when a liquid and gas mixture is passed therethrough. The change in direction of the flow when passing from one chamber to the next and the centifugal effect of the vortex flow separates the denser fluid from the less dense gas.

7 Claims, 4 Drawing Sheets

LIQUID FROM GAS SEPARATOR AND AN INTERNAL COMBUSTION ENGINE INCLUDING SAME

This invention relates to the separation of liquid from gas in high volume gas flows and in particular to a separator for separating the oil from the air in breather gases produced by an internal combustion engine.

Internal combustion engines generally require a breather system to take gas, which escapes from the cylinders into the crankcase region, up through the cylinder block and cylinder head and out through the cover for the cylinder head from where they are fed back into the air intake system for the cylinders. The breather gases generally pass up through oil drainage passages in the engine.

In engines with overhead camshafts the gases pass around the camshafts, which tends to result in significant amounts of oil being mixed with the breather gases which increases the unwanted emissions from the engine.

The presence of oil in breather gases can lead to the fouling of engine inlet ports and can create soot in exhaust gas recirculation systems. As requirements for the control of emissions get increasingly more severe the need to remove oil from breather gases increases.

It is known from GB-A-2,131,484 to provide a Labyrinth separator formed as part of the cover for the cylinder head which relies on many reversals of flow direction to separate the oil from the air have previously been used to separate off the oil in such circumstances. However, such labyrinth separators result in high kinetic energy losses and require a considerable suction to draw the air through the separator.

It is known from DE-A-2,461,113 to use a cyclone-type separation device attached to the engine of a motor vehicle. One or more pipes are used to connect the separator to the engine, the breather gases being arranged to enter a separation chamber of the separation device tangentially and the separated oil collecting in the bottom of the chamber from where it is returned to a sump of the engine by a pump. An oil trap is required with such an arrangement to ensure that air cannot be drawn from the separation chamber by the pump. It is a disadvantage with such a separator that it occupies a considerable volume and thus makes packaging in situations where the engine is to be located in a confined space such as in a motor vehicle more difficult. In addition the need to connect the separator to the engine by pipes increase the complexity of the system from a manufacturing viewpoint.

It is further known fron U.S. Pat. No. 4,702,846 to provide a vortex array to separate a medium into separate components. The array producing a number of vortices rotating in opposite directions.

According to a invention there is provided an internal combustion engine having a cylinder head, a cylinder block, a crankcase, an oil reservoir, one or more camshafts, a cylinder head cover and an oil separator located within the cavity of the cylinder head cover characterised in that the oil separator has two or more interconnected substantially cylindrical chambers connected between a flow inlet and a flow outlet, each chamber having a ceiling defining an upper surface of the chamber, a floor defining a lower surface of the chamber and an entry passage connected to the chamber to produce a vortex within the respective chamber when a liquid and gas mixture is passed therethrough, the arrangement of the entry passages being such that contra-rotating vortices are produced in adjacent chambers of the separator.

There may be three chambers forming a set arranged in series between the flow inlet and the flow outlet, therebeing an inlet chamber, an intermediate chamber and an outlet chamber, the flow in each chamber being contra-rotatating with respect to the flow in adjoining chambers.

There may be two sets of three chambers both sets sharing a common outlet chamber.

The two sets may be arranged with the common outlet chamber in the middle and the two inlet chambers at either end so that breather gases flow inwardly from the flow inlets towards the common outlet chamber and then exits from an outlet connected to the common outlet chamber.

A downwardly depending weir may be provided in the entry passage to each chamber to prevent the flow of liquid between adjacent chambers along the ceiling of the chambers.

The separator may be formed as an integral part of the cylinder head cover for the engine.

The floor may be formed by a baffle plate interposed between the chambers and the remaining cavity defined by the cylinder head cover.

The invention will now be described by way of example with reference to the accompanying drawings, of which:

Figure 1:
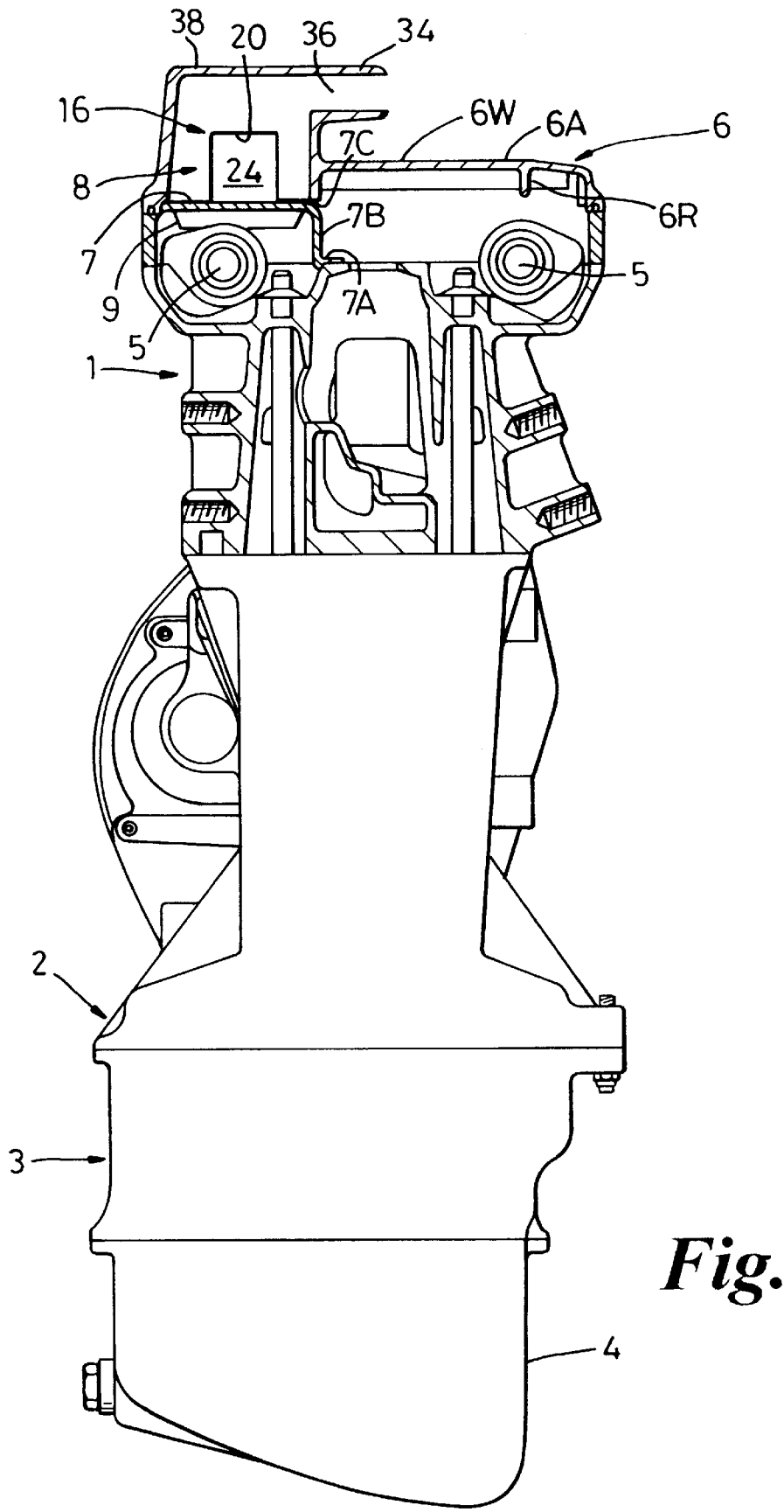
FIG. 1 is a part cross-sectional end view through an internal combustion engine in which the cylinder head and cylinder head cover are sectioned along a line corresponding to the V—V on FIG. 2 to show an oil separator according to a first embodiment of the invention.
Figure 2:
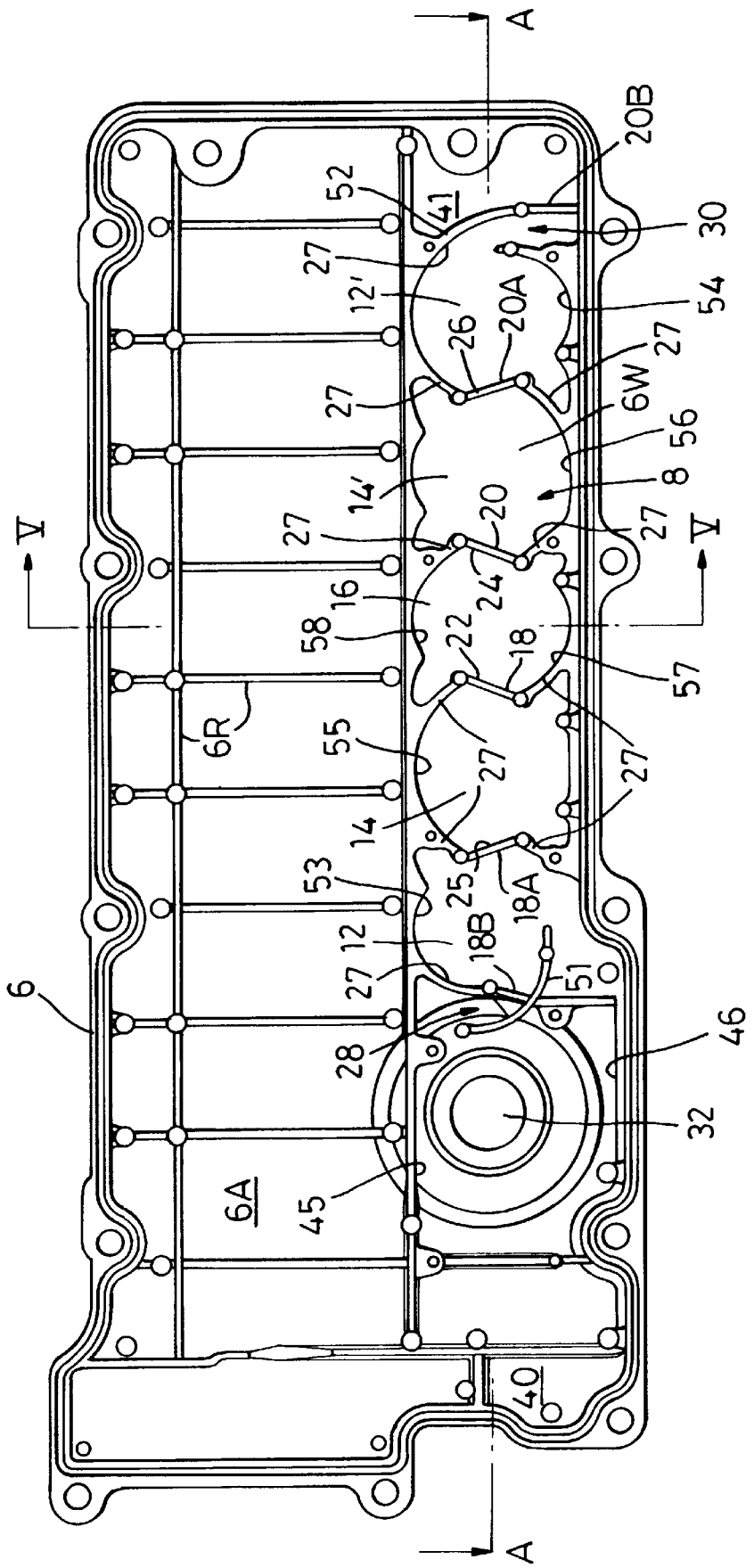
FIG. 2 is a underside view of the cylinder head cover shown in FIG. 1.
Figure 3:
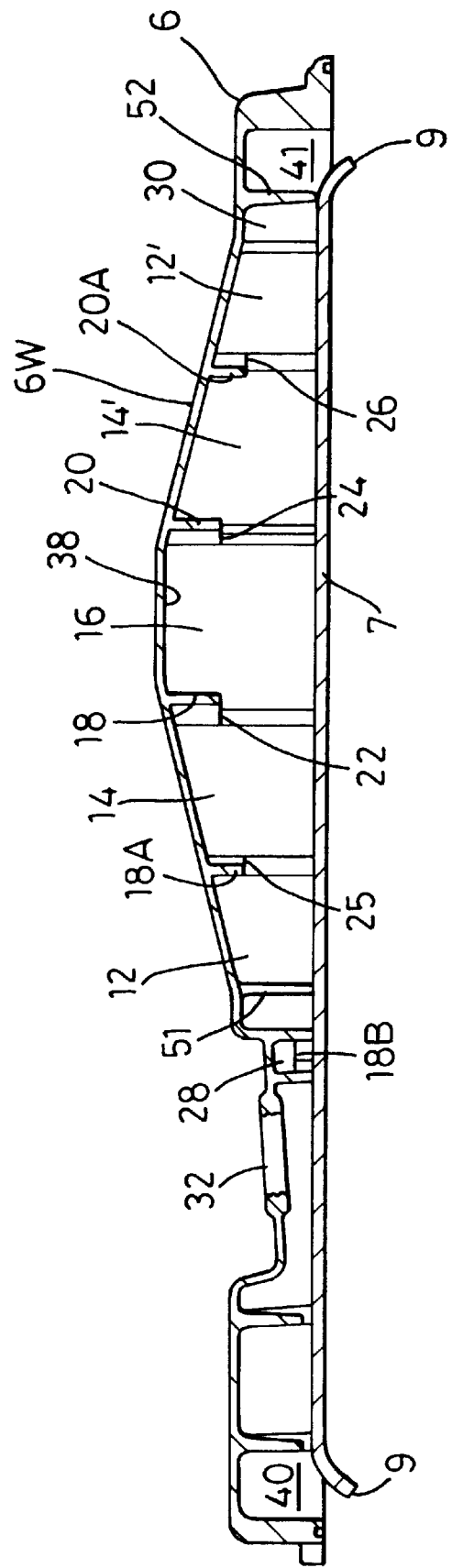
FIG. 3 is a longitudinal sectional view taken along line A—A on FIG. 2 showing the cylinder head cover of FIG. 2 and a baffle plate forming part of an oil separator according to said first embodiment of the invention.

With reference to FIGS. 1 to 3 there is shown a reciprocating internal combustion engine having a cylinder head 1, a cylinder block 2, a crankcase 3, an oil reservoir in the form of a sump 4, a pair of camshafts 5 rotatably supported by the cylinder head 1 and a cylinder head or camshaft cover 6.

A baffle plate 7 is interposed between the camshafts 5 and an oil separator 8. The baffle plate 7 extends along most of the length of the cylinder head cover 6 but has down turned end portions 9 to allow for the flow of breather gases from the cylinder head 1 into the oil separator 8 region and for the drainage of oil back to the cylinder head 1. The down turned end portions 9 make it extremely difficult for oil to be thrown by the rotating camshafts 5 directly into the oil separator 8.

To further prevent the direct flow of oil into the oil separator 8, the baffle plate 7 has a down turned longitudinal edge 7B which is sealed by a ribbon of sealant 7C to the cylinder head cover 6 along its top edge and has a lower edge 7A which is lightly engaged with a lip formed in the cylinder head 1.

The cylinder head cover 6 is cast from an aluminium alloy and has a generally flat cover portion 6A which is strengthened to reduce vibrations by a number of ribs 6R extending longitudinally and transversely with respect to the cylinder head cover 6. The oil separator 8 is formed as an integral part of the cylinder head cover 6 and extends longitudinally therealong.

The oil separator 8 comprises of five distinct interconnected part-cylindrical vortex chambers 12,12',14,14',16 arranged in a row along part of the length of the cylinder head cover 6. Each of the vortex chambers 12,12',14,14',16 has an upper surface or ceiling 38 formed by an upper wall 6W of the cylinder head cover 6 and a lower surface formed by the baffle plate 7.

The axial depth of the vortex chambers 12,12',14,14',16 increases from the end chambers 12,12' to the middle chamber 16, so that the innermost chamber 16 is deeper than the outer chambers 12 12'. The entry passages 22,24 to the central collection chamber 16 have weirs 18,20 therein which close off upper portions of the passages 22,24.

Similar weirs 18A, 20A are provided between the end chambers 12,12' and the adjacent intermediate chambers 14,14' and a further weir 18B,20B is provided in each of the inlet passages 28 and 30 to the oil separator 8.

The arrangement of the five vortex chambers 12,12',14,14',16 is such that it provides two sets of vortex separating chambers 12,14 and 12' 14' feeding a central or middle chamber 16. One gas inlet 28 supplies breather gases to one set of vortex chambers 12,14 and the other gas inlet 30 supplies breather gases to the other set of vortex chambers 12',14'. In this way the oil separator 8 is less vulnerable to variations in the orientation of the engine than it would be if there was only an inlet at one end.

Each of the end vortex chambers 12,12' has a curved vane 51,52 leading from the respective air inlet 28,30 into the chamber in one direction and a curved wall portion 53,54 extending away from the respective air inlet 28, 30 in the other direction.

The vanes 51,52 in combination with the curved wall portions 53,54 cause the breather gases entering the vortex chambers 12,12' to be deflected into a rotary motion thereby propagating the formation of a strong vortex within each of the vortex chambers 12,12'.

The higher density of the entrained oil results in it being less able to follow such a path and it tends to be thrown outwardly against the curved wall portions 53,54 and then drains down to the baffle plate 7.

The intermediate vortex chambers 14,14' have a curved wall portion 55,56 of opposite curvature to the vanes 51,52 such that when the breather gases are transfered via the entry passages 25,26 they undergo a change in rotational direction which further helps to separate out the entrained oil from the breather gases.

The central vortex chamber 16 receives breather gases from both of the intermediate vortex chambers 14,14' and has two curved wall portions 57,58 each of which extends away from one of the inlets 22, 24 to the vortex chamber 16.

The wall portions 57,58 co-operate with each other to maintain the rotary motion of the breather gases and are shaped so as to once again reverse the rotational direction of the breather gases as they are transferred from the intermediate chambers 14,14' to the central vortex chamber 16.

The upper surface of the cylinder head cover 6 has a high level air outlet 36 in the form of a stub pipe 34 formed therein for co-operation with the central chamber 16. The stub pipe 34 is in use connected via a pipe (not shown) back into an air inlet associated with the engine as is normal practice.

Although the stub pipe 34 is shown extending horizontally in FIG. 1 it is preferable if it can extend vertically from the centre of the ceiling 38 above the central chamber 16 as this further reduces the risk of oil escaping from the cylinder head 1 back into the air inlet side of the engine. However in this case the stub pipe 34 is arranged horizontally to reduce the vertical height of the engine compared with a vertically extending stub pipe.

At each end of the cylinder head cover 6 there are plenum areas 40, 41 in which the breather gases enter by passing around the down-turned end portions 9 of the baffle plate 7 before entering the end vortex chambers 12,12'. An oil filler orifice 32 is provided in the upper wall 6W of the cylinder head cover 6 between a first end vortex chamber 12 and the plenum 40 at that end of the cylinder head cover 6.

A relatively calm region is formed around the filler orifice 32 which is well sheltered from oil splash by the presence of the baffle plate 7 and is in a region where the cross-sectional area between the baffle plate 7 the ceiling 38 and the side walls 45,46 is large thereby producing a relatively low breather gas velocity compared to the gas velocity in the vortex chambers 12,12',14,14' and 16. Therefore if oil is admitted to the engine while it is running the risk of the oil being pulled through to the air outlet 36 is minimised.

In use, breather gases enter the air inlets 28,30 from the plenums 40,41. The air inlets 28, 30 are of relatively small cross-sectional area and so the flow velocity is increased to provide a jet of breather gas moving in a direction which is generally tangential with respect to a hypothetical cylinder defined by the vanes 51,52 and the wall portions 53,54 of the first vortex chambers 12,12'. This tangential entry and the shape of the first vortex chambers 12,12' encourages the formation of a strong vortex within the chamber.

The arrangement and orientation of the vortex chambers 12,12',14,14' and 16 produces a series of three contra-rotating vortices, each series combining in the middle chamber 16.

As viewed from beneath (as in FIG. 2) the vortices are anti-clockwise in the entry end chambers 12,12', clockwise in the intermediate chambers 14,14', and form a common anti-clockwise vortex in the central vortex chamber 16.

Any oil that is separated from the breather gases drains down the walls of the vortex chambers and out through the air inlets 28,30. Although the baffle plate is sealed along one longitudinal edge it is not sealed between adjacent chambers and so oil can also migrate or seep from chamber to chamber along the baffle plate 7 by passing beneath the wall portions 27 separating adjoining chambers. In addition the baffle plate is not sealed to the cylinder head cover 6 along the outer side wall 46 and so oil can also seep back in the region. The oil can therefore drain from the vortex chambers 12,12', 14,14',16 from one end or the other or transversely and so the orientation of the engine is less significant than if the oil can only drain away in one place.

The relatively oil-free breather gases exit the separator 8 through the high level outlet 36 positioned above the central vortex chamber 16 and are then returned to the air inlet side of the engine.

The flow from one vortex chamber to the next of any oil which may collect on the ceiling 38 of the vortex chambers 12,12'14,14'16 is inhibited by the ceiling weirs 18,18A,18B, 20,20A,20B which project downwardly from the ceiling 38 at the entrance to each of the vortex chambers 12,12'14, 14'16.

As the oil and air mist passes from the inlet chambers 12,12' to the central chamber 16 the oil is separated by from the air by the change in direction which occurs when the air moves from one chamber to the next. The heavier oil is unable to undergo the change in direction required to move into the next chamber and thus flows downwardly where it is collected by the baffle plate 7. The air follows a very unrestricted passage from the outer chambers 12,12' to the central chamber 16 and thus undergoes very little loss in kinetic energy and thus the pressure drop across the separator 8 is very low compared to a conventional labyrinth separator. This allows the separator 8 to operate efficiently when even a modest vacuum is applied to the outlet 36.

Figure 4:
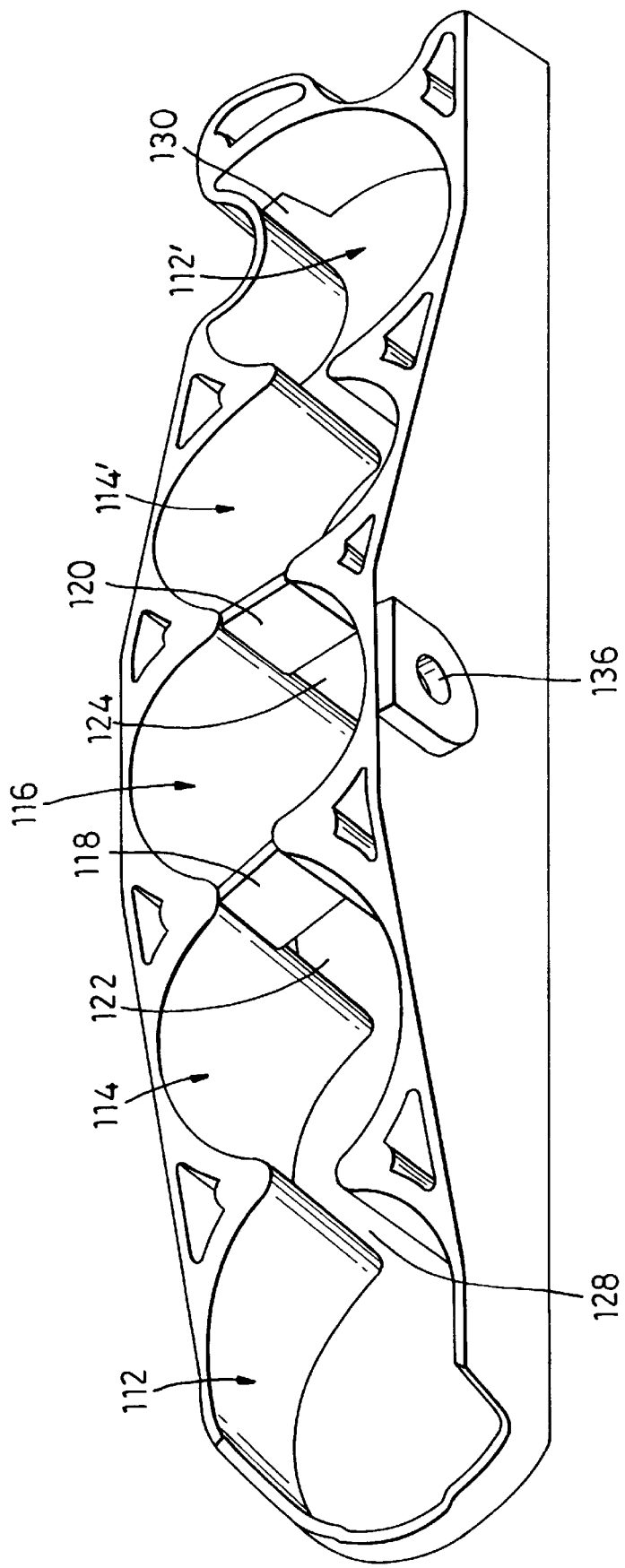
FIG. 4 is a pictorial view of part of an oil separator according a second embodiment of the invention.

With reference to FIG. 4 there is shown an oil separator 108 for an internal combustion engine. The oil separator 108 is in most respects the same as that previously described above and for which the same reference numerals with the addition of 100 have been used.

The oil separator as shown is made from an engineering grade of plastic but could also be made from other materials such as aluminium alloy or cast iron.

The oil separator 108 in this case is a separate component and is not formed as part of the cylinder head cover. This would enable the advantages of the invention to be obtained in situations where for some reason it is not desirable or possible to form the oil separator as part of the cylinder head cover. For example, it is possible to use a simple pressed metal container into which the oil separator 108 is fitted with appropriate inlet and outlet connections.

It will be appreciated that although the invention has been described with respect to a specific application for the removal of oil from air it is not limited to the exact embodiments described herein. For example, the vortex chambers can be arranged in another configuration such as in a line from inlet to outlet so that the exit chamber is at one end and not in the middle. In addition there need not be five vortex chambers there could be only two chamber or there could be several more but in each case there would be a change in direction of rotation of the flow from one chamber to the next.

It will be appreciated that the invention is applicable to any type of internal combustion engine but when formed as an integral part of the cylinder head cover it is particularly suitable for use in motor vehicles where the limited space can make the packaging of a separate oil separator difficult.

It will be appreciated that the separator can be used to separate liquid from gas in many situations and is not limited to the separation of oil from air in an engine for example it could be used to separate water from air.

I claim:

1. An internal combustion engine having a cylinder head (1), a cylinder block (2), a crankcase (3), an oil reservoir (4), one or more camshafts (5), a cylinder head cover (6) and an oil separator (8) located within the cavity of the cylinder head cover (6) characterised in that the oil separator (8) comprises two or more interconnected substantially cylindrical chambers (12,12',14,14',16) connected between a flow inlet and a flow outlet, each chamber having a ceiling (38) defining an upper surface of the chamber, a floor (7) defining a lower surface of the chamber and an entry passage (22,24,25,26,28,30) connected to the chamber to produce a vortex within the respective chamber when a liquid and gas mixture is passed therethrough, the arrangement of the entry passages (22,24,25,26,28,30) being such that contra-rotating vortices are produced in adjacent chambers (12,12',14,14', 16) of the separator (8).

2. An engine as claimed claim 1 in which there are three chambers (12,12',14,14',16) forming a set arranged in series between the flow inlet (40,41) and the flow outlet (36), therebeing an inlet chamber (12,12'), an intermediate chamber (14,14') and an outlet chamber (16), the flow in each chamber being contra-rotating with respect to the flow in adjoining chambers (12,12',14,14',16).

3. An engine as claimed in claim 2 in which there are two sets of three chambers (12,12',14,14',16) both sets sharing a common outlet chamber (16).

4. An engine as claimed in claim 3 in which the two sets are arranged with the common outlet chamber (16) in the middle and the two inlet chambers at either end so that breather gases flow inwardly from the flow inlets (40,41) towards the common outlet chamber (16) and then exits from an outlet (36) connected to the common outlet chamber (16).

5. An engine as claimed in any of claims 1 to 4 in which a downwardly depending weir (18,18A,18B;20,20A,20B) is provided in the entry passage (22,24,25,26,28,30) to each chamber to prevent the flow of liquid between adjacent chambers (12,12',14,14',16) along the ceiling (38) of the chambers (12,12',14,14',16).

6. An Engine as claimed in any of claims 1 to 5 in which the separator (8) is formed as an integral part of the cylinder head cover (6) for the engine.

7. An engine as claimed in any of claims 1 to 6 in which the floor is formed by a baffle plate (7) interposed between the chambers (12,12',14,14',16) and the remaining cavity defined by the cylinder head cover (6).

\* \* \* \* \*